United States Patent [19]

Manka

[11] 3,748,906
[45] July 31, 1973

[54] GAS SAMPLING APPARATUS
[75] Inventor: Dan Paul Manka, Pittsburgh, Pa.
[73] Assignee: Jones & Laughlin Steel Corporation, Pittsburgh, Pa.
[22] Filed: Oct. 15, 1970
[21] Appl. No.: 80,989

[52] U.S. Cl............................................. 73/421.5 A
[51] Int. Cl. ............................................ G01h 1/24
[58] Field of Search................. 73/421.5 R, 421.5 A

[56] References Cited
UNITED STATES PATENTS
3,457,787 7/1969 Maatsch............................. 73/421.5
3,495,463 2/1970 Howell............................. 73/421.5 A

*Primary Examiner*—S. Clement Swisher
*Attorney*—T. A. Zalenski and G. R. Harris

[57] ABSTRACT

Gas-sampling apparatus for sampling a dirt- and moisture-laden gas stream, such as blast-furnace top gas, cleaning the gas and delivering it to a gas analyzer employs parallel sampling probes and associated filter units to permit continuous alternate sampling and cleaning of the filters by back-flushing. The apparatus automatically ceases sampling whenever a foreign gas is introduced into the gas stream being sampled.

4 Claims, 2 Drawing Figures

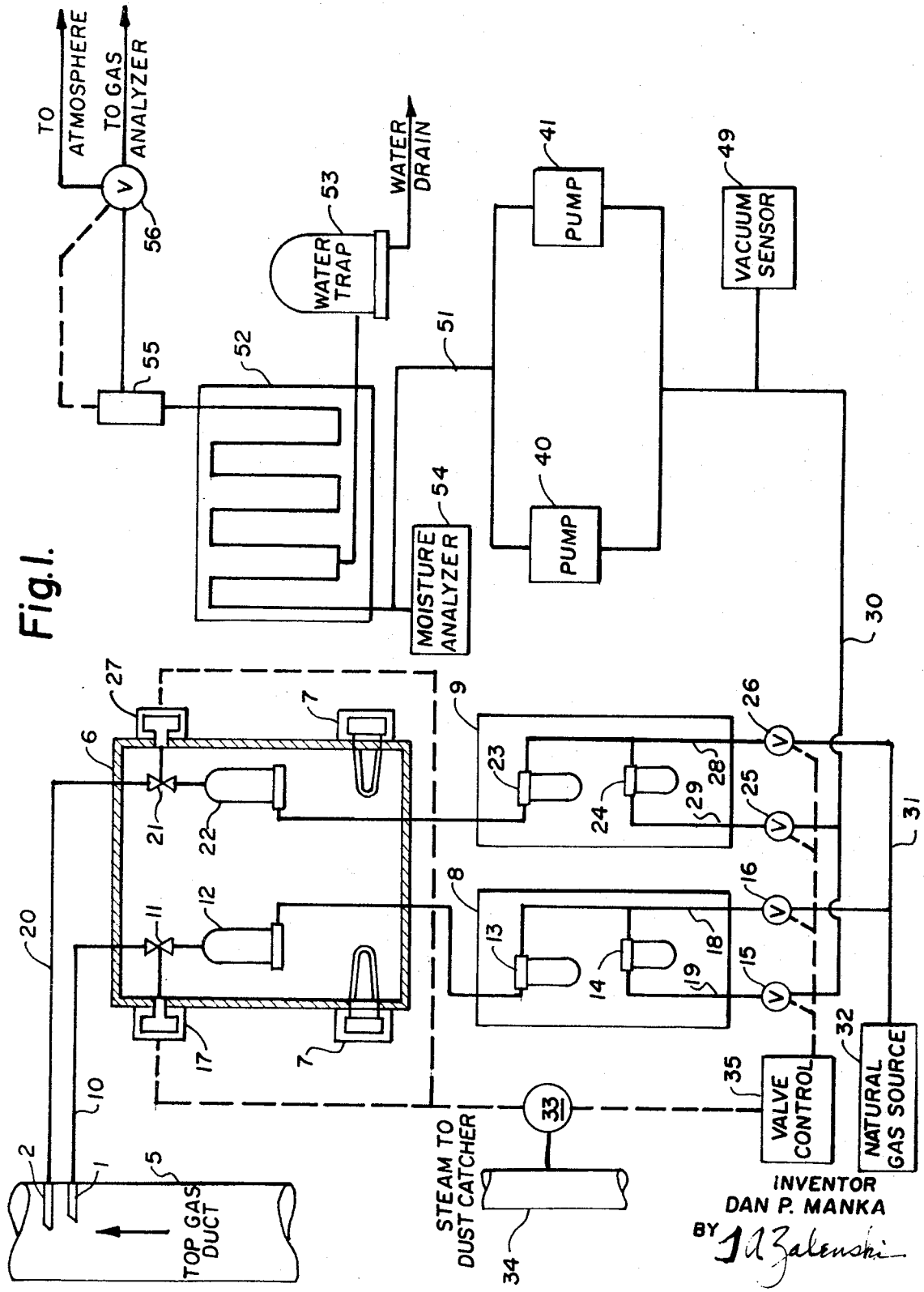

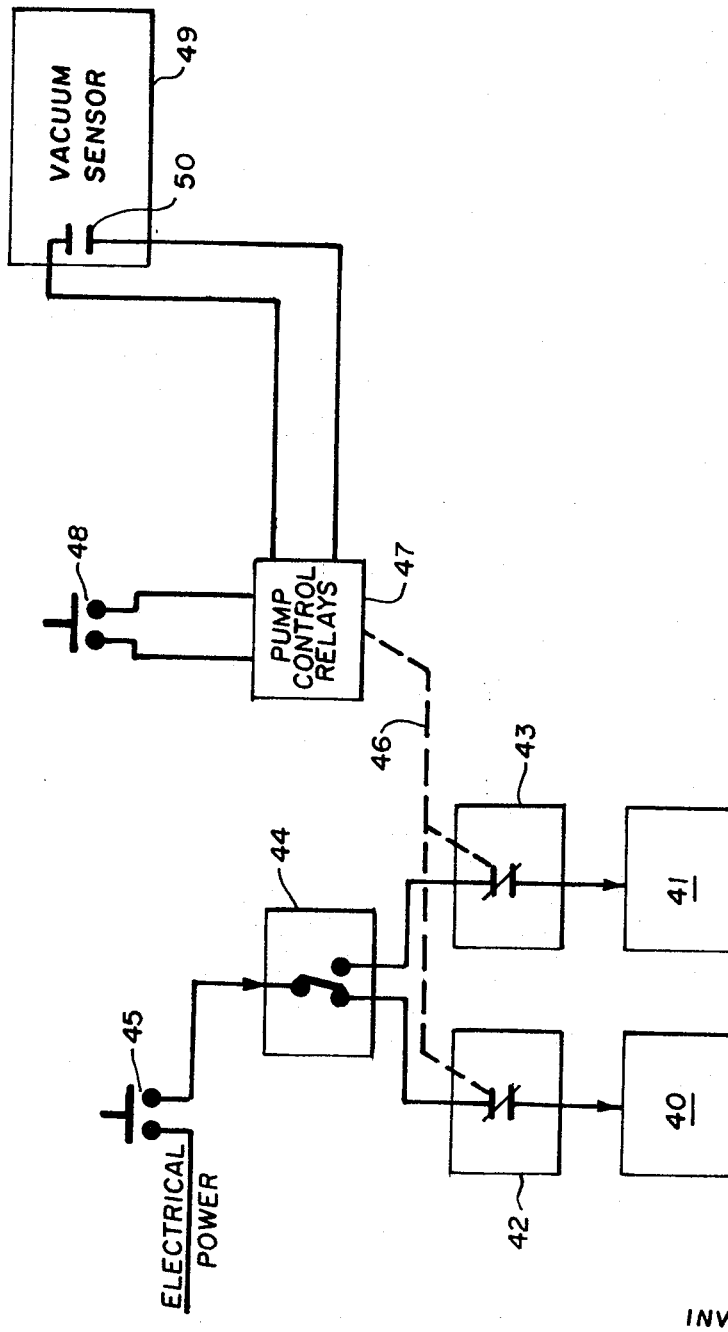

GAS SAMPLING APPARATUS

This invention relates to apparatus for continuously sampling a gas stream, cleaning the gas, and passing it to a gas analyzer.

In many industrial processes which emit gaseous reaction products, samples of the gases are taken and analyses of the gases made in order to provide information regarding the progress of the processes. Typically, these gases are dirt- and moisture-laden and must be cleaned before they can be analyzed. In addition, transient conditions often occur in the course of a process, during which time gas sampling must be discontinued to prevent damage to the sampling and analyzing apparatus or for other reasons.

The gas-sampling apparatus of the present invention includes sampling means in the form of two sampling probes for taking in samples of a gas, such as a blast furnace top gas, flowing through a duct and passing the samples to a filtering system for removing solid particles from the gas. The filtering system comprises two filtering units, each in fluid communication with a respective one of the sampling probes. The filter units are connected both to a sample-gas delivery and a purging-gas delivery line, and the latter is connected to a source of purging gas. The filter units are alternately placed in fluid communication with the sample-gas and purging-gas delivery lines so that while sampling is occurring through one probe and its associated filtering unit, the other filtering unit and probe are being backflushed with purging gas. The apparatus further includes means for removing moisture from the filtered gas before it passes to the gas analyzer and a flood sensor for causing the gas stream to divert from the gas analyzer when the moisture level in the gas is above a preselected value. Sampling is automatically halted whenever a condition arises which would result in a gas other than the gas being sampled being withdrawn into the sampling apparatus.

An object of the invention is to provide apparatus for continuously sampling a gas stream, cleaning the sampled gas, and delivering it to a gas analyzer. Another object is to provide such apparatus including a gas-filtering system consisting of two parallel filtering units associated with sampling probes whereby sampling through one probe and filter unit can occur while the other probe and filtering unit is being cleaned by gas backflushing. Still another object of the invention is to provide such apparatus which automatically ceases sampling upon the occurrence of a transient condition. Yet another object of the invention is to provide such apparatus in conjunction with an iron-making blast furnace.

These and other objects and advantages of the invention will become more apparent from the following detailed description thereof with reference to the accompanying drawing in which:

FIG. 1 is a schematic illustration of an embodiment of the invention; and

FIG. 2 is a schematic illustration, showing in greater detail a portion of the apparatus of FIG. 1.

The gas-sampling apparatus of the invention, illustrated in FIG. 1, includes sampling means comprising sampling probes 1 and 2, such as lengths of ½-inch diameter stainless steel tubing, associated with a gas duct 5 for taking in samples of gas flowing through the duct and passing the samples to a gas-filtering system. In a typical installation, the probes are mounted in the wall of gas duct 5 which passes blast-furnace top gas from the dust catcher to the gas washer of a blast-furnace plant.

The gas-filtering system consists of two filtering units. Probe 1 is in fluid communication by way of line 10 with the filtering unit consisting of filters 12, 13, and 14; and probe 2 is in fluid communication by way of line 20 with the filtering unit consisting of filters 22, 23, and 24. Two probes and a filtering unit for each are provided to permit sample gas to pass through one probe and its associated filter unit while the other filter unit is being cleaned by back-flushing. Valve means comprising electrical valve actuator units 17 and 27 and associated valves 11 and 21, which valves are located within sampling lines 10 and 20, respectively, function to selectively close off the passage of sample gas from the sampling means to the gas filtering system. Thus, during gas sampling, valves 11 and 21 are open to permit the passage of gas through lines 10 and 20, respectively, but, at other selected times, the valves are actuated to close off the passage of sample gas from the sampling means to the gas-filtering system, as described in more detail below.

The filtering unit consisting of filters 12, 13, and 14, and associated with sampling probe 1, is in fluid communication with sample-gas delivery line 30 by way of gas line 19 in which valve 15 is located. The filtering unit is also in fluid communication with purging-gas line 31 by way of gas line 18 in which valve 16 is located. Similarly, the filtering unit consisting of filters 22, 23, and 24, and associated with sampling probe 2, is in fluid communication with sample-gas delivery line 30 by way of gas line 29 in which valve 25 is located. This filtering unit is in fluid communication with purging-gas line 31 by way of gas line 28 in which valve 26 is located. Sample-gas delivery line 30 conveys filtered sample gas away from the filtering units. Purging-gas line 31 is connected to a natural gas source 32 under pressure and delivers the natural gas to the filter units. The natural gas back-flushes the filters and discharges the back-flushed material into duct 5 through the probes.

Valve control means 35 is operatively connected to valves 15, 16, 25 and 26, and controls the valves to alternately place one of the filter units in fluid communication with the sample-gas delivery line 30 and the other filter unit in communication with the purging-gas delivery line 31. Thus, valve control means 35 functions to alternately open both valves 15 and 26 while closing valves 16 and 25 and to open both valves 16 and 25 while closing valves 15 and 26.

From the foregoing it will be understood that when gas sampling is occurring through probe 1, valve 15 is opened and valve 16 closed. At the same time, valve 25 is closed and valve 26 opened to place lines 28 and 31 in fluid communication. As a result, natural gas from source 32 passes successively through filters 23 and 22, backflushing these filters of solids and carrying the solids through line 20 and probe 2 to discharge them into duct 5.

Alternately, when sampling is taking place through probe 2 and valve 25 is opened and valve 26 closed, valve 15 is also closed and valve 16 opened to place lines 18 and 31 in fluid communication. Natural gas from source 32 under these circumstances backflushes filters 12 and 13 and discharges the solids into duct 5 through probe 1.

Filters 12 and 22 each includes a fiber-glass filter element capable of removing solid particles down to a size of 50 microns from the sample gas. Preferably, these filters are located immediately adjacent the sampling probes 1 and 2 so that essentially all of the larger solid particles are removed from the sample gas shortly after the gas enters the sampling system. Filters 12 and 22, along with valves 11 and 21 are maintained within chamber 6, heated by heating elements 7—7 so as to prevent the condensation of moisture from the sample gas. Liquid condensed from the gas tends to form heavy mud-like deposits with the solid particles and these deposits are deleterious to the smooth operation of the system generally and the filter elements particularly. Filters 13 and 14 also are maintained within a heated chamber 8, and filters 23 and 24 are maintained within a heated chamber 9. Chambers 8 and 9, preferably, are located at a station which is convenient to service and need not be located adjacent chamber 6 which, typically, is located on the top of the dust catcher. Filters 13 and 23 each includes a fiber-glass filter element capable of removing solid particles larger than 50 microns from the gas and thereby filter from the sample-gas stream any large particles which may have passed their respective associated filters 12 and 22. I have found fiber-glass filter elements to be particularly effective in my invention because they tend to retain filtered particles on their outer surface whereby the particles are readily removed by backflushing of the elements. Filters 14 and 24 each includes a cellulose-epoxy filter element capable of removing solid particles larger than 10 microns from the sample gas. In addition to heating chambers 6, 8 and 9 the gas-sample lines throughout the system are heated by means of heating tapes.

Whenever repairs or changes are made in a blast furnace, it is common practice to inject steam into the dust catcher to prevent the ingress of air and a resulting explosion. Because top gas duct 5 and the duct for passing steam to the dust catcher are in fluid communication through the dust catcher, the continued operation of the sampling system during such steam injection would result in steam being drawn into the filter system, thereby ruining the filter elements. Accordingly, means, comprising a conventional pressure switch 33, is provided in association with pipe line 34 for passing steam to the dust catcher to cause valves 11 and 21 to close off the passage of sample gas from the sampling means 1, 2 to the gas-filtering system upon the passage of steam to the dust catcher. Preferably, valves 11 and 21 are ball valves whose open and closed positions are controlled by actuator units 17 and 27 respectively. Ball valves and actuator units suitable for application to the invention are described in literature available from Worcester Valve Co., Inc., of West Boylston, Mass. Injection of steam into the dust catcher through line 34 increases the pressure in line 34 to activate switch 33 and thereby energize actuators 17 and 27 which drive ball valves 11 and 21, respectively, to closed positions.

Pressure switch 33 is also operatively connected to valve control means 35. Activation of switch 33 results in valve control means 35 closing valves 15, 16, 25, and 26 so as to simultaneously close off fluid communication between the filter units and both the sample-gas line 30 and the purging-gas line 31 upon the passage of the steam through pipe line 34. When steam injection is discontinued and the steam pressure in pipe line 34 drops, a signal from pressure switch 33 activates a timing device in valve control means 35 which, after a selected time period for allowing blast furnace gas to purge steam from the dust catcher and duct 5, activates a relay to open valves 16 and 26. Both filter units are then backflushed for a selected time period after which the system is returned to the sampling position it was in upon commencement of steam injection.

Pump means comprising two alternately operating M-D pumps 40 and 41 serve to withdraw sample gas from duct 5 and pump the gas through the sampling system to a gas analyzer. The pumps are connected in parallel to sample-gas delivery line 30 and discharge line 51 which conveys the gas to means 52 for removing moisture from the gas. A vacuum sensor means 49 is connected to sample-gas delivery line 30 between the filtering units and the pump means for sensing the pressure within the delivery line and providing a signal when the pressure in the delivery line falls below a preselected level indicating an interruption in sample gas flow. Thus, upon the occurrence of a low pressure, e.g., a vacuum of ten inches of mercury, in line 30, as occurs when valves 15, 16, 25 and 26 are closed upon injection of steam to the dust catcher or as occurs when the filters become plugged, sensor means 49 issues a signal to a pump control means which turns off whichever of pumps 40 and 41 is in operation to prevent damage to the pump.

Referring to FIG. 2, pumps 40 and 41 are provided with motor starters 42 and 43, respectively. Pump selector switch 44 connected to the motor starters permits selective operation of the pumps. The selector switch is connected to an on-off switch 45 which in turn is connected to a source of electrical power. Motor starters 42 and 43 are further connected, through line 46, to pump control means 47 which is connected to both reset switch 48 and vacuum sensor 49. Preferably, vacuum sensor 49 is maintained so that when the pressure in line 30 reaches a vacuum of ten inches of mercury contacts 50 close to energize pump control means 47 which then deactivates the motor starters to turn off whichever pump is operating at the time. Whenever the condition which caused the vacuum to occur passes, contact 50 opens to deenergize pump control means 47 which results in the startup of whichever motor is in an operating position as determined by pump selector switch 44.

Means for removing water moisture from the sample gas, such as a Hankison refrigerator, is located downstream from the pumps 40 and 41. The removal of moisture is required where a high moisture level in the gas has a deleterious effect on the gas analyzer equipment. Moisture removed from the gas is collected in water trap 53 and the trap emptied through a suitable drain. A moisture analyzer 54 is connected to line 51 and provides a record of the moisture content of the gas before it enters refrigerator 52.

A flood sensor means 55 is located between refrigerator 52 and the gas analyzer for controlling valve 56 to either direct the sample gas to the analyzer or divert it from the analyzer to the atmosphere when the moisture level in the sample gas is in excess of a preselected valve. The flood sensor is an electronic switch that operates when water condenses on its probe. Such condensation increases the electrical conductivity of the probe causing an increase in electrical current flow through the probe. The increased current operates a relay which provides line voltage to an electrical outlet to control valve 56. Flood sensors of this type are described in literature available from SKC, Inc. of Pittsburgh, Pa.

I claim:

1. Gas sampling apparatus including sampling means comprising at least two sampling probes mounted in a first gas duct, for taking samples of a gas flowing therethrough, a filtering system including two filtering units, each probe being in fluid communication with a respective one of the filtering units, valve means in each of the filtering units for closing the passage of sample gas from the sampling means to the same, a sample gas delivery line for conveying filtered sample gas, a purging-gas delivery line connected to a source of purging gas, and means for alternately placing one of the filter units in fluid communication with the sample-gas delivery line and the other filter unit in communication with the purging gas delivery line, a second gas duct for selectively passing a second gas, said first and second gas ducts being in fluid communication, means in the second gas duct in communication with each of said valve means and said alternating means automatically causing each of said valve means to terminate the passage of sample gas from the sampling means into the gas filtering units and to terminate fluid communication between both filter units and the sample-gas and purging-gas lines, respectively, upon the passage of said second gas through said second gas duct.

2. The gas-sampling apparatus of claim 6 wherein said automatic means in the second gas duct includes a pressure switch and actuator means for opening and closing each of said valve means in response to said second gas acting on said pressure switch.

3. The gas-sampling apparatus of claim 1 further including pump means for pumping sample gas through the apparatus to a gas analyzer, vacuum sensor means connected to said sample-gas delivery line between the filtering units and the pump means for sensing the pressure within the delivery line and providing a signal when the pressure in the delivery line falls below a preselected level indicating an interruption in sample gas flow, and pump control means for turning off the pump means in response to the signal provided by the vacuum sensor means.

4. The apparatus of claim 3 including means for removing water moisture from the sample gas and means located between the means for removing water moisture and the gas analyzer for causing the gas stream to divert from the gas analyzer when the water moisture level in the sample gas is in excess of a preselected value.

* * * * *